United States Patent
Contrucci et al.

(10) Patent No.: US 6,565,623 B2
(45) Date of Patent: May 20, 2003

(54) METHOD AND APPARATUS FOR CURING SELF-REDUCING AGGLOMERATES

(75) Inventors: Marcos de Albuquerque Contrucci, Rio de Janeiro (BR); Edmar Saul Marcheze, Santa Catarina (BR)

(73) Assignee: Startec Iron LLC, Edina, MN (US)

( * ) Notice: Subject to any disclaimer, the term of this patent is extended or adjusted under 35 U.S.C. 154(b) by 0 days.

(21) Appl. No.: 09/811,430

(22) Filed: Mar. 20, 2001

(65) Prior Publication Data

US 2002/0166414 A1 Nov. 14, 2002

(51) Int. Cl.⁷ .............................................. C22B 1/214
(52) U.S. Cl. ........................................ 75/760; 266/197
(58) Field of Search ...................... 75/760, 768; 266/197

(56) References Cited

U.S. PATENT DOCUMENTS

| | | |
|---|---|---|
| 2,739,800 A | 3/1956 | Sisco |
| 3,323,901 A | 6/1967 | Ovale et al. |
| 4,049,435 A * | 9/1977 | Lotosh et al. ................. 75/768 |
| 4,468,253 A | 8/1984 | Tajima et al. |
| 4,636,342 A * | 1/1987 | Miyashita et al. ............ 75/760 |

FOREIGN PATENT DOCUMENTS

| | | |
|---|---|---|
| GB | 1 413 346 | 11/1975 |
| JP | 56 033438 | 4/1981 |

OTHER PUBLICATIONS

Lotosh V. E. et al., "Improvement of the Process of Accelerated Strengthening of Cold–Bound Pellets", vol. 23, No.12, pp. 1–5. 1993 No Month.

* cited by examiner

*Primary Examiner*—Melvyn Andrews
(74) *Attorney, Agent, or Firm*—Finnegan, Henderson, Farabow, Garrett & Dunner LLP

(57) ABSTRACT

The present invention refers to a method and an equipment for curing and drying self-reducing agglomerates containing cement as a binder in the presence of saturated vapor at a temperature from about 70 to about 110° C. and under atmospheric pressure. The treatment is performed in one single equipment. The self-reducing agglomerates are comprised of mixtures of fines of iron ore and/or industrial residue containing iron oxides and/or metallic iron, fines of carbonaceous materials such as mineral coal, charcoal, green petroleum coke and similar fines, fluxing material such as steel plant slag and blast furnace slag, limestone, lime and similar materials, cement as a binder and fluxing agent, and humidity between 7 and 12%, produced in pellet-making units and/or briquette-making units and thereafter treated using one single piece of equipment, involving the steps of predrying with heated gasses (2), curing with saturated vapor (3) and drying with heated gasses (4) performed continuously and sequentially, controlling the discharge velocity (5) in order to allow the time of permanence of the agglomerate within the equipment to be from about 4 to about 12 hours. The cured and dried agglomerate may be processed in an adequate reducing/melting equipment to provide metals and metallic alloys.

14 Claims, 1 Drawing Sheet

METHOD AND APPARATUS FOR CURING SELF-REDUCING AGGLOMERATES

BACKGROUND OF THE INVENTION

The present invention relates to a method for curing self-reducing agglomerates containing iron oxide and cement as a binder to achieve the mechanical strength properties required for use thereof in subsequent refining operations for the production of iron.

The development of iron bearing agglomerates began in the fifties. These agglomerates were mainly in the form of pellets, with the purpose of enabling the use of mineral fines, which the conventional methods, such as those used in blast furnaces, cupola furnaces, electric furnaces and others, could not accept as raw materials due to the fine size thereof, particularly in the case of iron ore. Some time thereafter the development of self-reducing agglomerates began. This development was characterized by the use of cold cure binders, particularly cement, lime and silica, which exhibit as the cure mechanism, mainly reactions with water (hydration) and in lesser amount with the carbon dioxide present in the air (carbonation). Those reactions, although imparting to the agglomerate the desired mechanical properties, are slow reactions, requiring between 10 to 30 days for completion, and sometimes even more depending on the weather conditions (the cure velocity diminishes with the decrease of the ambient temperature).

Some alternatives were developed to accelerate the hydration reactions referred to above, by means of treatment of the agglomerates in pressure vessels (autoclaves) by applying pressures on the order of up to 20 atmospheres and water vapor at 250° C., as recited in U.S. Pat. No. 4,528,029, which is incorporated herein. The major disadvantage of this alternative practice is the high cost of the equipment required and the complex operating conditions, rendering the commercial application thereof difficult.

SUMMARY OF THE INVENTION

In accordance with the invention, there is provided a method for producing self-reducing agglomerates for use in producing iron. The method includes producing a particle mixture comprising iron oxide containing particles of a carbon containing reductant and a cement binder. Water is added to the particle mixture to produce a moisture content therein of about 7 to 12%. Thereafter, the particle mixture is formed into agglomerates. The agglomerates are sequentially and continuously pre-dried by contacting them with hot gas at a temperature of about 80 to 180° C. to reduce the moisture content of the agglomerates. The dry agglomerates are then contacted with water at a temperature of about 70 to 110° C. to promote a curing reaction between the water vapor and the cement. They are then dried with hot gas at a temperature of about 80 to 180° C. to achieve a selected moisture content.

The particle mixture may include a fluxing agent.

The agglomerates may be used to constitute a descending column thereof during sequential and continuous pre-drying, curing, and drying.

Preferably, the moisture content of the particle mixture may be about 8 to 10%.

The sequential and continuous pre-drying, curing, and drying may be performed at atmospheric pressure.

The curing step may be conducted for about 4 to 12 hours.

The iron oxide containing particles may include at least one of iron ore and industrial residue.

The descending column of agglomerates for sequential and continuous predrying, curing, and drying, may be within a single reactor vessel.

Further, in accordance with the invention, there was provided apparatus for producing self-reducing agglomerates having a cement binder for use in producing iron. The apparatus includes an elongated, vertical curing and drying chamber. An inlet is provided at the top of the chamber for introducing a particle mixture of said agglomerates. The agglomerates comprise iron-oxide containing particles and particles of a carbon containing reductant and a cement binder, with a moisture content therein of about 7 to 12%. A predrying zone is provided in the chamber at an upper portion thereof for predrying the particle mixture. A curing zone is provided in the chamber at a mid-portion thereof for curing the cement binder. A drying zone is provided in the chamber at a bottom portion thereof for drying the particle mixture.

At the predrying zone of the chamber means are provided for contacting the particle mixture with a hot gas at a temperature of about 80 to 180° C. to dry the particle mixture. At the curing zone means are provided for contacting the particle mixture with water-containing hot gas at a temperature of about 70 to 110° C. to cure the cement binder. At the drying zone means are provided for contacting the particle mixture with hot gas at a temperature of about 80 to 180° C. to dry the particle mixture.

Within the chamber means are provided for controlling intermixing of the gas from each zone of the chamber. In this regard, the gas may be metered between zones to regulate or permit intermixing. This may include means for channeling the gas introduced to the predrying zone to leave the chamber at the top thereof, channel the gas introduced to the curing zone to leave the chamber from a side outlet at the curing zone, and channel the gas introduced to the drying zone to leave the chamber from a side outlet at the drying zone.

Means may be provided for diverting hot has into contact with an exterior portion of the chamber at the predrying zone thereof. The hot gas may be directed in this regard by providing a shell surrounding the exterior portion of the chamber in spaced-apart relation thereto and a passage through which the hot gas is directed to a space formed between the exterior chamber portion and the shell.

DETAILED DESCRIPTION OF THE PREFERRED EMBODIMENTS

Figure 1:
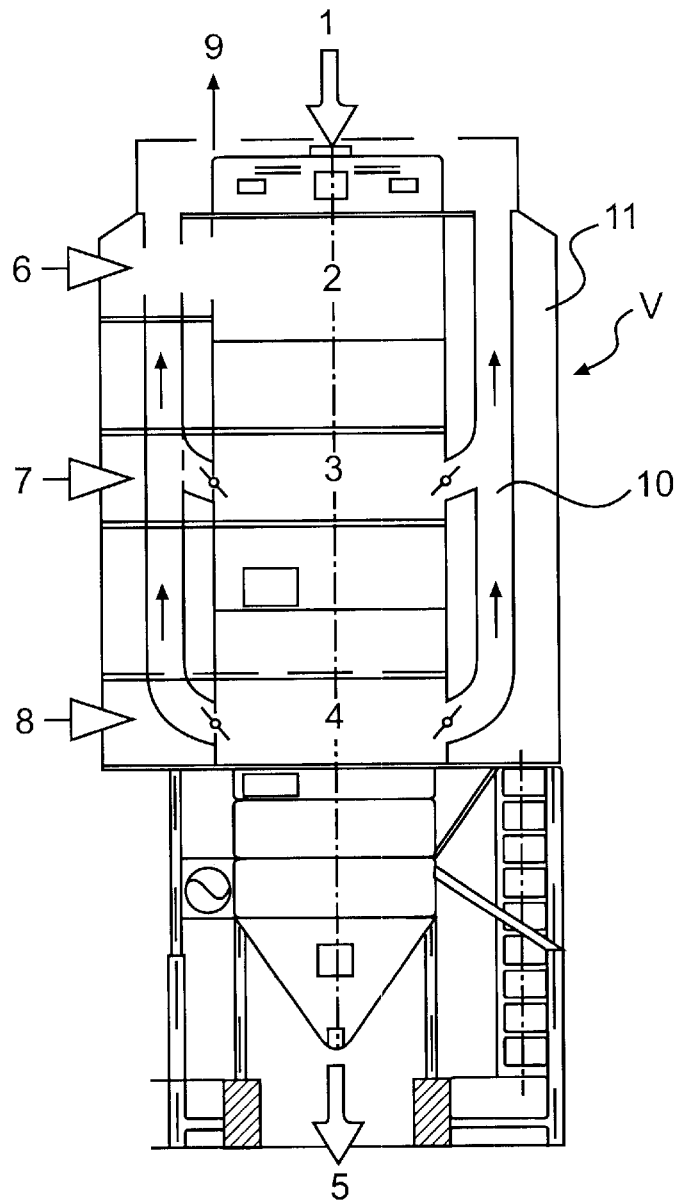
FIG. 1 is a front view of one embodiment of apparatus for use in curing and drying agglomerates in accordance with the method of the invention.
Figure 2:
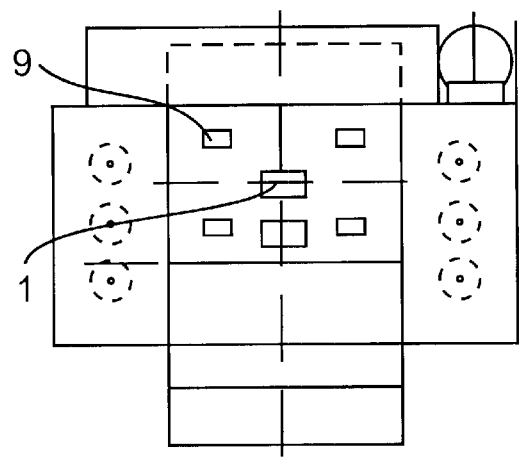
FIG. 2 is a top view of the apparatus of FIG. 1.

The self-reducing agglomerates, as described above, are cured and dried in an embodiment of apparatus in accordance with the invention as shown in FIGS. 1 and 2. This apparatus comprises a reactor vessel, designated generally as V. The agglomerates enter the top of the vessel at an opening designated as 1 and pass sequentially and continuously through a predrying section 2, a curing section 3, and a drying section 4. They are discharged from the vessel at discharge opening 5 in the bottom thereof.

In the predrying section 2, the material is contacted with hot gas a temperature of 80 to 180° C. through a valve 6. The predried material descends along the vessel and enters the curing section where it is contacted with water containing hot gas at a temperature of 70 to 110° C. through valve 7. The cured material having been dried in the drying section is withdrawn from the vessel through a port 5 in the bottom thereof. A portion of the off gas exits at port 9 from the top of the vessel. An additional portion is directed through a space 10 formed by a cylindrical collar 11 into contact with the exterior of the predrying, curing and drying sections. This prevents intermixing of the gas from each of the three sections.

In accordance with the invention, agglomerates in the form of pellets were produced both in the laboratory (bench scale) and in a full scale plant (pilot plant) as set forth in Table 1. The agglomerates were produced from a mixture of fines of iron ore, coal and coke, with cement as a binder. These green agglomerates are cured by predrying, curing by contact with water vapor and drying. Upon curing and drying, the agglomerates were tested for cold compression strength by measuring the resistance for fracture by compression.

TABLE 1

| Pellet Diameter mm | Vapor Temp. ° C. | Curing Time Hour | Cold Compression Strength kgf/pellet | Specified Cold Compression Strength kgf/pellet |
|---|---|---|---|---|
| Bench Scale Results: | | | | |
| 13 | 90–100 | 4.5 | 38.58 | >20 |
|  |  | 5.5 | 40.84 |  |
| 12 | 90–100 | 4.5 | 17.80 | >17 |
|  |  | 5.5 | 21.50 |  |
| 12 | 90–100 | 7.5 | 18.94 | >17 |
| 12 | 90–100 | 4.5 | 17.76 | >17 |
| 14 | 90–100 | 5 | 23.30 | >23 |
| 11 | 90–100 | 6 | 28.04 | >15 |
|  |  | 7 | 32.7 |  |
| 12 | 90–100 | 5 | 23.7 | >17 |

| Pellet Diameter mm | Steam Temp. ° C. | Curing Time (continuous prod.) Hour | Cold Compression Strength kgf/pellet | Specified Cold Compression Strength kgf/pellet |
|---|---|---|---|---|
| Module Full Scale Results: Pilot plant | | | | |
| 11–14 | 90–100 | 10 | Between 31.6 and 50.1 | >15 for 11 mm >23 for 14 mm |
| 11–14 | 90–100 | 8 | Between 17.72 and 49.0 | 15 for 11 mm >23 for 14 mm |

What is claimed is:

1. A method for producing self-reducing agglomerates for use in producing iron comprising:
    producing a particle mixture comprising iron oxide containing particles and particles of a carbon containing reductant and a cement binder;
    adding water to said particle mixture to produce a moisture content therein of about 1 to 12%;
    thereafter forming said particle mixture into agglomerates;
    sequentially and continuously reducing said moisture content of said agglomerates by contacting said agglomerates with hot gas at a temperature of about 80 to 180° C. to dry said agglomerates to form dry agglomerates, contacting said dry agglomerates with water-containing hot gas at a temperature of about 70 to 110° C. to cure said cement to form cured agglomerates, and thereafter drying said cured agglomerates with hot gas at a temperature of about 80 to 180° C. to achieve a selected moisture content.

2. The method of claim 1, wherein said particle mixture includes a fluxing agent.

3. The method of claim 1 or claim 2, wherein said agglomerates constitute a descending column thereof during sequential and continuous predrying, curing, and drying.

4. The method of claim 2, wherein said moisture content of said particle mixture is about 8 to 10%.

5. The method of claim 1 or claim 2, wherein said sequential and continuous predrying, curing, and drying are performed at atmospheric pressure.

6. The method of claim 1 or claim 2, wherein said curing is achieved in about 4 to 12 hours.

7. The method of claim 1 or claim 2, wherein said iron oxide containing particles include at least one of iron ore, and industrial residue.

8. The method of claim 3, wherein said descending column is within a single reactor vessel.

9. The method of claim 2, wherein said fluxing agent is slag from electric furnace steel production.

10. Apparatus for producing self-reducing agglomerates having a cement binder for use in producing iron comprising:
    an elongated, vertical curing and drying chamber;
    an inlet at a top of said chamber for introducing a particle mixture of said agglomerates comprising iron-oxide containing particles and particles of a carbon containing reductant and a cement binder, with a moisture content therein of about 7 to 12%;
    a predrying zone in said chamber at an upper portion of said chamber for predrying said particle mixture introduced to said predrying zone;
    a curing zone in said chamber at a mid-portion of said chamber for curing said cement binder of said particle mixture introduced to said curing zone: and
    a drying zone in said chamber at a bottom portion of said chamber for drying said particle mixture introduced to said drying zone;
    with said chamber having means for controlling Intermixing of said gas from each said zone.

11. The apparatus of claim 10, wherein means are provided at said predrying zone for contacting said particle mixture with hot gas at a temperature of about 80 to 180° C. to dry said particle mixture;
    means are provided at said curing zone for contacting said particle mixture with hot gas at a temperature of about 80 to 180° C. to cure said particle mixture.

12. The apparatus of claim 11, wherein said means for controlling intermixing of said gas from each zone channels said gas introduced to said predrying zone to leave said chamber at the top of said chamber;
    channels said gas Introduced to said curing zone to leave said chamber from a side outlet at said curing zone; and
    channels said gas introduced to said drying zone to leave said chamber from a side outlet at said drying zone.

13. The apparatus of claim 10, wherein means are provided for directing hot gas into contact with an exterior portion of said chamber at said predrying zone thereof.

14. The apparatus of claim 13, wherein said means for said directing of said hot gas into contact with said exterior portion of said chamber at said predrying zone includes a shell surrounding said exterior portion in spaced-apart relation thereto and a passage through which said hot gas is directed to a space formed between said exterior portion and said shell.

* * * * *